United States Patent

Mohr

Patent Number: 4,702,599
Date of Patent: Oct. 27, 1987

[54] ROTATION RATE MEASURING INSTRUMENT

[75] Inventor: Friedemann Mohr, Renningen, Fed. Rep. of Germany

[73] Assignee: International Standard Electric Corp., New York, N.Y.

[21] Appl. No.: 749,062

[22] Filed: Jun. 26, 1985

[30] Foreign Application Priority Data

Jul. 7, 1984 [DE] Fed. Rep. of Germany ....... 3425053

[51] Int. Cl.$^4$ ............................................. G01C 19/64
[52] U.S. Cl. ................................................... 356/350
[58] Field of Search ................... 356/350, 345; 372/6, 372/34; 250/227; 350/96.29

[56] References Cited

U.S. PATENT DOCUMENTS 4,534,222  8/1985  Finch et al. .................... 250/227

Primary Examiner—Davis L. Willis
Assistant Examiner—S. A. Turner
Attorney, Agent, or Firm—Christie, Parker & Hale

[57] ABSTRACT

In the rotation rate measuring instrument, two light beams traverse a coiled optical fiber (1) in opposite directions. The two beams emerging from the optical fiber are combined, and the rotation rate is determined from the Sagnac phase difference between the two beams. The optical fiber (1), which may be embedded in a sealing compound (4), is contained in a double-walled housing (8, 9) having its two walls linked by heat bridges (10, 10'). The material of the housing is a good thermal conductor. The heat bridges between the two walls are located so that external heat will act on the coiled optical fiber (1) at predetermined points.

15 Claims, 5 Drawing Figures

ROTATION RATE MEASURING INSTRUMENT

The present invention relates to a rotation rate measuring instrument as set forth in the preamble of claim 1. An instrument of this kind is disclosed in DE-OS No. 31 36 688.

From this reference it is known that temperature effects on the coiled optical fiber cause measurement errors. By embedding the optical fiber in a sealing compound, the disturbing temperature effect is greatly reduced. It turned out, however, that precision measurements necessitate a further reduction of the temperature effect.

This problem is solved by the means set forth in claim 1. Further advantageous aspects of the invention are characterized in the subclaims.

If the optical-fiber coil is enclosed in a double-walled housing temperature-dependent measurement errors are greatly reduced. An especially great reduction is obtained if the heat bridge(s) is (are) located so that the temperature effect on the light path is as symmetrical as possible.

The invention will now be explained in more detail, by way of example, with reference to the accompanying drawings, in which.

Figure 1:
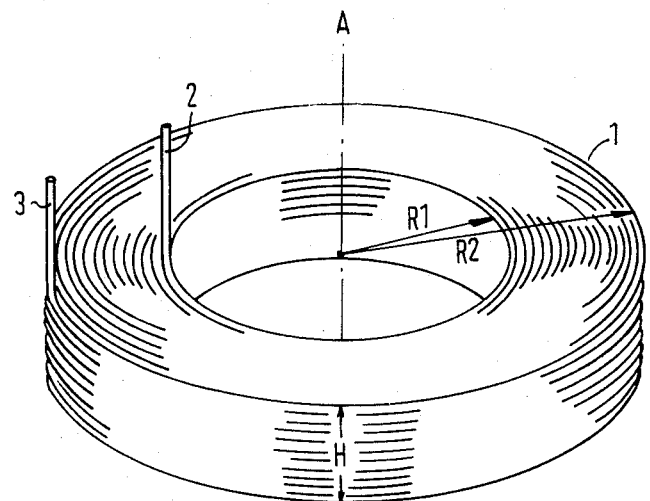
FIG. 1 is a schematic representation of the coiled optical fiber.

FIG. 1 shows a coiled optical fiber 1. The two ends of the optical fiber are designated 2 and 3. Also marked in FIG. 1 is the coil axis A. The inside radius of the optical-fiber coil is R1, and the outside radius R2. The height of the optical-fiber coil is designated H. The two ends of the optical fiber are arranged symmetrically with respect to a circle with the radius $(R1+R2)/2$.

Figure 2:
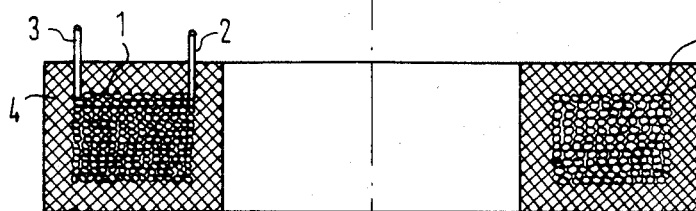
FIG. 2 is a cross-sectional view of the optical-fiber coil of FIG. 1, with the optical fibers (unlike in the representation of FIG. 1) embedded in a sealing compound.

FIG. 2 shows a section through the optical-fiber coil of Fig.1, but unlike in the representation of Fig.1, the optical fiber is embedded in a sealing compound 4. the sealing compound serves to reduce the effect of external interference on the optical fiber.

Figure 3:
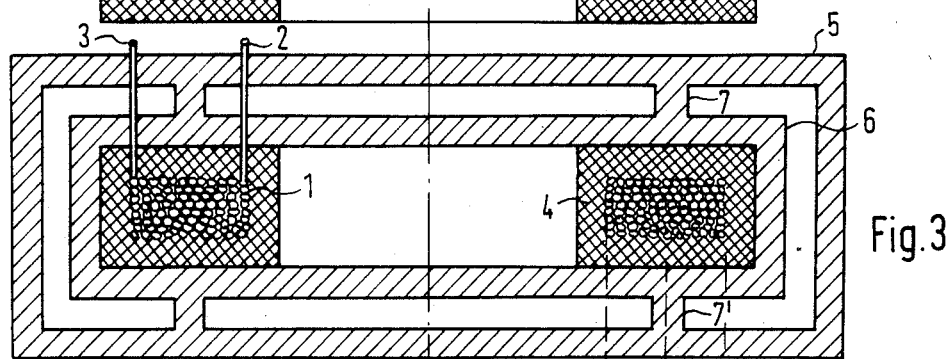
FIGS. 3 and 4 are cross-sectional views of two embodiments in which the optical-fiber coil embedded in a sealing compound is contained in a double-walled housing.
Figure 4:
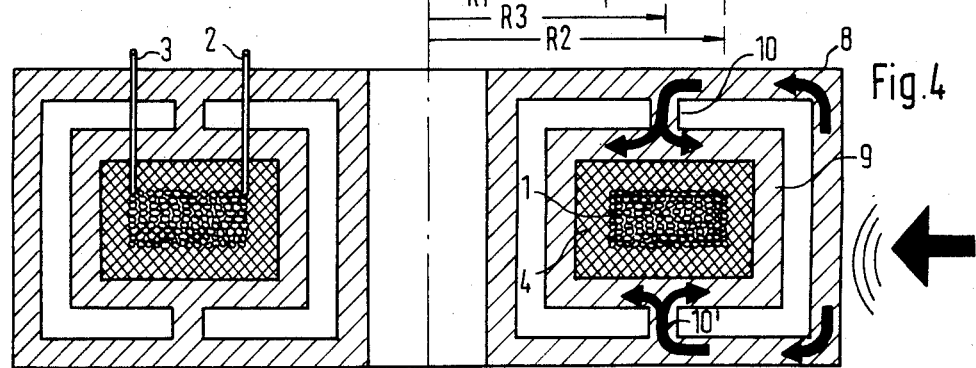

FIG. 3 shows a first embodiment of the novel rotation rate measuring instrument in which the optical fiber, embedded in a sealing compound, is contained in a double-walled housing 5, 6, 7, 7'. FIG. 3, like FIG. 2, is a cross-sectional view of the rotation rate measuring instrument. The section plane is the same as in FIG. 2. The double-walled housing consists of two parts 5 and 6 which are fitted within one another and linked by heat bridges 7 and 7'. In the section plane chosen, the two parts 5 and 6 each have the shape of a rectangle. The two heat bridges 7 and 7' each have the shape of a circular ring, the radius R3 of this ring being equal to $(R1+R2)/2$. In the left-hand portion of the section, like in FIG. 1, the two ends 2 and 3 of the fiber are shown. The material of the housing and the heat bridges is a very good thermal conductor. The two heat bridges 7 and 7' cause thermal radiation striking the outside of the housing to act on the optical fiber 1 as symmetrically as possible. As the action of heat on the optical fiber is symmetrical, the effect of the heat received on measurement accuracy is minimized. FIG. 4 shows a cross section through a second embodiment. While in the embodiment of FIG. 3 the two nested parts of the housing have the shapes of hollow cylinders each having a cover at the top and at the bottom, the housing in the embodiment of FIG. 4 has the shape of a double-walled hollow ring in which the two walls are linked by two ring-shaped heat bridges. The two walls of the hollow ring are designated by the reference characters 8 and 9, and the two heat bridges by 10 and 10'. For the optical fiber, the sealing compound, and the two ends of the optical fiber, the same reference characters as in FIGS. 2 and 3 are used. The distribution of the thermal radiation striking the rotation rate measuring instrument will now be explained with the aid of FIG. 4. The thermal radiation strikes the outer wall of the housing from the right (black arrow). The impact spot can be any point of the housing. The heat propagates from the impact spot through the outer wall of the double-walled ring and then through the heat bridges 10 and 10' to the inner wall of the ring. While the point at which the thermal radiation impinges on the outer wall is not predeterminable, the impingement of the thermal radiation on the inner wall is precisely defined. The impingement point on the inner wall is always the point where the inner wall is linked to the outer wall by the thermal bridges 10 and 10'. Thus, the thermal radiation always strikes the optical fiber symmetrically, and the effect of the thermal radiation on measurement accuracy is minimized.

The cavity between the two hollow cylinders with covers (FIG. 3) or between the two walls of the double-walled ring (FIG. 4) is implemented so that heat transfer between the outer and the inner wall—aside from the points where the two walls are linked by the heat bridges—is kept to a minimum, for only this ensures that nearly the entire heat striking the outer wall will impinge on the inner wall at the desired points. This is achieved by filling the cavity with a good heat insulator or evacuating it as far as possible, in which case it is advantageous to provide the cavity with an internal mirror coating.

Optimum reduction of the effect of the thermal radiation striking the measuring instrument is achieved if the following measures are taken: To wind the optical fiber into a coil (with or without coil form), a symmetric winding technique is used (as proposed in German Patent Application No. 32 32 718); the optical fiber coil is embedded in a compound of high thermal conductivity, which reduces the effect of thermal radiation on the optical fiber (as set forth in DE-OS No. 31 52 704), and the embedded fiber-optic coil is enclosed in a double-walled housing having its two walls linked by heat bridges as described above. Depending on the desired accuracy of the rotation rate measuring instrument, one, two or all three of these features will be implemented.

Figure 5:
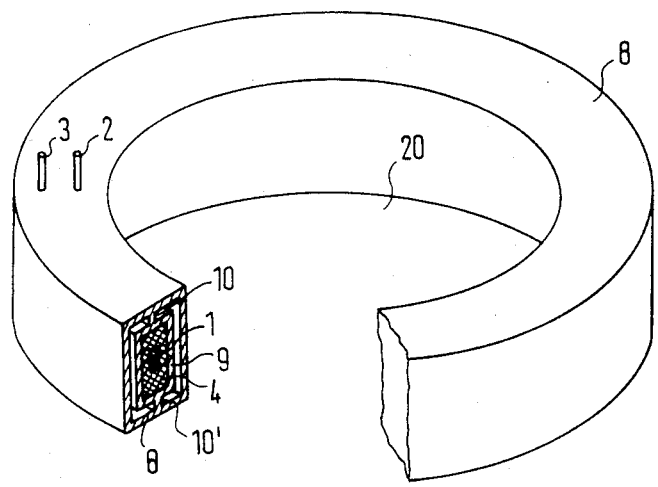
FIG. 5 is a schematic representation of an optical-fiber coil contained in a housing as shown in FIG. 4.

FIG. 5 is a schematic representation of the optical-fiber coil surrounded by a double-walled hollow ring and embedded in a sealing compound. A portion of the ring has been cut away. The same reference characters as in FIG. 4 are used. In the interior 20 of the ring, the evaluation electronics of the rotation rate measuring instrument can be accommodated.

I claim:

1. Rotation rate measuring instrument wherein two light beams having travelled in opposite directions over at least one closed light path formed by a coiled optical fiber are combined, and wherein the Sagnac phase difference between the two light beams is evaluated, characterized in that the optical fiber is contained in a double-walled housing, that the walls of the housing are made of a good thermal conductor, and that at least one heat bridge is provided between the walls.

2. An instrument as claimed in claim 1, characterized in that the axis of symmetry of the heat bridge is the coil axis.

3. An instrument as claimed in claim 1, characterized in that the housing has the shape of two hollow cylinders fitted within one another and each having a cover at the top and a cover at the bottom, and that the heat bridge links two adjacent covers.

4. An instrument as claimed in claim 3, characterized in that both the covers at the tops and the covers at the bottoms are linked by a heat bridge.

5. An instrument as claimed in claim 1, characterized in that the housing has the shape of a double-walled hollow ring.

6. An instrument as claimed in claim 5, characterized in that both the inner wall and the outer wall of the hollow ring are rectangular in section.

7. An instrument as claimed in claim 5, characterized in that a plurality of heat bridges including said at least one heat bridge is provided between said walls and every two portions of the double wall which are opposite each other in a direction parallel to the coil axis are linked by a particular one of said plurality of heat bridges.

8. An instrument as claimed in claim 2, characterized in that said at least one heat bridge is ring-shaped.

9. An instrument as claimed in claim 2, characterized in that the radius of the ring is approximately equal to the radius of the central winding of the coil.

10. An instrument as claimed in claim 2, characterized in that the heat bridge is located so that the action of heat on the light path is as symmetrical as possible.

11. An instrument as claimed in claim 1, characterized in that the optical fiber is embedded in a sealing compound of high thermal conductivity.

12. An instrument as claimed in claim 7, characterized in that each said particular one of said plurality of heat bridges is ring-shaped.

13. An instrument as claimed in claim 12, characterized in that the radius of the ring is approximately equal to the radius of the central winding of the coil.

14. An instrument as claimed in claim 12, characterized in that each said particular one of said heat bridges is located so that the action of heat on the light path is as symmetrical as possible.

15. An instrument as claimed in claim 14, characterized in that the optical fiber is embedded in a sealing compound of high thermal conductivity.

* * * * *

UNITED STATES PATENT AND TRADEMARK OFFICE
CERTIFICATE OF CORRECTION

PATENT NO. : 4,702,599
DATED : October 27, 1987
INVENTOR(S) : Friedemann Mohr

It is certified that error appears in the above-identified patent and that said Letters Patent is hereby corrected as shown below:

On the title page assignee should read

--(73) Assignee: Alcatel NV, Amsterdam, The Netherlands --.

Column 1, line 48, "the" should read -- The --.

Signed and Sealed this

Thirteenth Day of September, 1988

Attest:

DONALD J. QUIGG

*Attesting Officer*  *Commissioner of Patents and Trademarks*